United States Patent
Wang

(10) Patent No.: US 6,860,451 B1
(45) Date of Patent: Mar. 1, 2005

(54) SPACECRAFT SPIN AXIS REORIENTATION METHOD

(75) Inventor: Qinghong W. Wang, Torrance, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/719,329

(22) Filed: Nov. 21, 2003

(51) Int. Cl.$^7$ .............................................. B64G 1/24
(52) U.S. Cl. ..................................................... 244/164
(58) Field of Search ................................ 244/164–171, 244/158 R, 159; 703/4, 13

(56) References Cited

U.S. PATENT DOCUMENTS

| | | | |
|---|---|---|---|
| 3,565,370 A | * 2/1971 | Moller et al. | 244/197 |
| 4,161,780 A | * 7/1979 | Rudolph et al. | 701/13 |
| 4,630,790 A | * 12/1986 | Williams, Jr. | 244/169 |
| 4,752,884 A | * 6/1988 | Slafer et al. | 701/13 |
| 4,837,699 A | * 6/1989 | Smay et al. | 701/13 |
| 5,452,869 A | * 9/1995 | Basuthakur et al. | 244/164 |
| 5,667,171 A | * 9/1997 | Fowell et al. | 244/165 |
| 5,758,846 A | * 6/1998 | Fowell | 244/165 |
| 5,935,176 A | * 8/1999 | Nielson | 701/4 |
| 6,061,611 A | * 5/2000 | Whitmore | 701/4 |
| 6,154,691 A | * 11/2000 | Bailey | 701/13 |
| 6,382,565 B1 | * 5/2002 | Fowell | 244/165 |
| 6,574,534 B2 | * 6/2003 | Yamashita | 701/13 |
| 6,629,672 B1 | * 10/2003 | Goodzeit et al. | 244/171 |
| 6,745,984 B2 | * 6/2004 | Defendini et al. | 244/166 |

OTHER PUBLICATIONS

B. Wie, H.Weiss, and A. Arapostathis: "Quaternion Feedback Regulator for Spacecraft Eigenaxis Rotations", Journal of Guidance, vol. 12, No 3, May–Jun. 1989, p. 375–380.
H.Weiss: "Quaternion–Based Rate/Attitude Tracking System with Application to Gimbal Attitude Control", Journal of Guidance, vol. 16, No. 4, Jul.–Aug. 1993, p. 609–616.

* cited by examiner

Primary Examiner—Teri P. Luu
Assistant Examiner—Stephen Holzen

(57) ABSTRACT

A reorientation controller for a satellite includes a slew rate command generator that generates a slew rate command signal ($\vec{\omega}_{r\_cmd}$) in response to an attitude error signal. The attitude error signal corresponds to the difference between an initial attitude and a target attitude. The slew rate command generator may introduce a phase lead ($\theta_L$) into the slew rate command signal ($\vec{\omega}_{r\_cmd}$). The controller may perform a spin phase synchronization when the target attitude is unsynchronized in spin phase with the initial attitude. The satellite may perform a reorientation maneuver in response to the slew rate command signal ($\vec{\omega}_{r\_cmd}$).

40 Claims, 5 Drawing Sheets

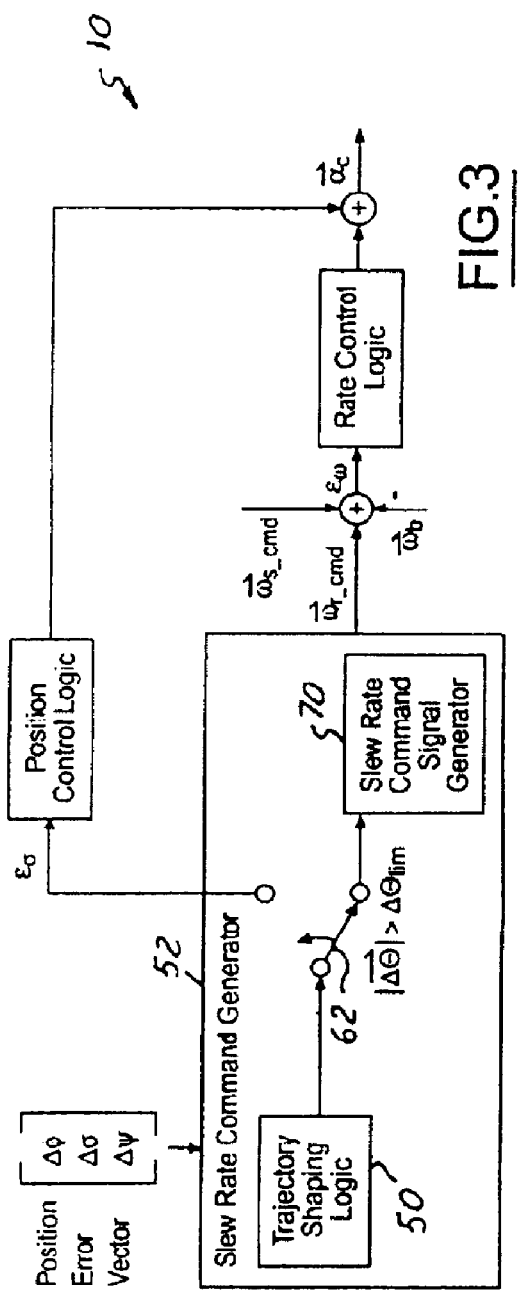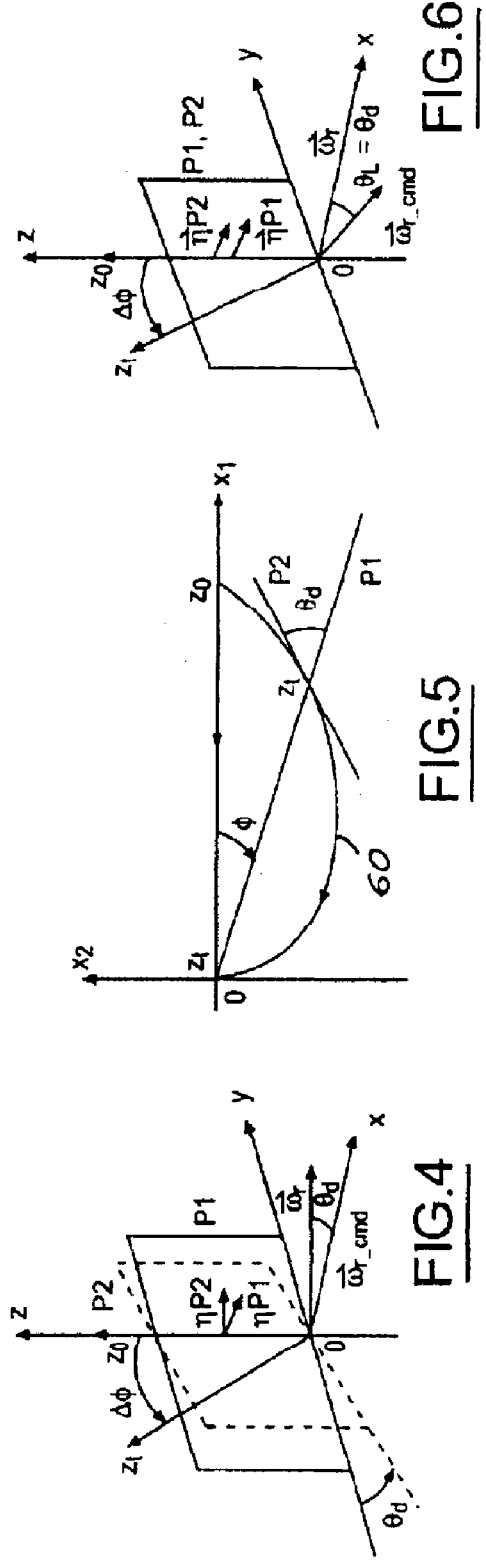

SPACECRAFT SPIN AXIS REORIENTATION METHOD

TECHNICAL FIELD

The present invention is related generally to satellite reorientation systems. More particularly, the present invention is related to a system and method of reorienting the spin axis of a satellite.

BACKGROUND OF THE INVENTION

Spin axis reorientation maneuvers are utilized, over a spinning transfer orbit and during a mission, to position a satellite in a proper Perigee/Apogee burn attitude or a proper liquid apogee motor (LAM) burn attitude. A spin axis reorientation maneuver may also be utilized to change the sun polar angle of the satellite to provide favorable power and thermal conditions. The satellite spin axis can be reoriented via control of onboard thrusters.

To perform a reorientation maneuver, a satellite controller compares a target attitude with an initial or estimated attitude to determine an angle error therebetween. The commanded and estimated attitudes are often represented by quaternions. The angular error signal can be represented by an error quaternion, or be referred to as the Euler angle by small angle approximation. The satellite then performs a closed-loop reorientation maneuver using the angular error to generate an acceleration command signal is converted into torque generated by the thrusters and exerted on the satellite, which in effect moves the spin axis of the satellite toward a target orientation. Ability to precisely control the spin axis trajectory during the reorientation maneuver, or in effect, the movement of the satellite spin axis in inertial space, is highly desirable. Improved control of the spin axis trajectory can provide an increase in maneuver flexibility and accuracy, as well as simplify fault protection design and, as well as fuel efficiency.

In particular, a "minimum-angle" slew is often desired. Minimum-angle slew refers to the rotating of the spin axis about an axis that is normal to both a first unit vector, along the initial spin axis, and a second unit vector, along the target spin axis. In performing a minimum angle slew, the spin axis trajectory of the satellite follows an arc of a great circle, i.e., a generally non-curved, shortest distance path on along a perimeter of a sphere.

Several reorientation control methods have been utilized to reorient a satellite with minimum-angle rotation. The control methods tend to generate a control signal, which is directed about an instantaneous eigenaxis or along the direction of an instantaneous angular position error vector, and include the use of reorientation and rate tracking, and angle and rate limits. The instantaneous angular position error vector is the vector representation of attitude error. However, these control methods are limited to being performed when the satellite is in a non-spinning state and are incapable of controlling a spin axis trajectory during a reorientation maneuver.

In a non-spinning state, the eigenaxis of the satellite is fixed in the satellite body coordinate frame and is stationary in inertial space. The eigenaxis is the Euler axis about which a single rotation can be performed to change the attitude of a body between orientations. In the spinning state, the instantaneous eigenaxis, in the body frame, is changing constantly. The constant change in instantaneous eigenaxis prevents the spin axis from following a minimum-angle reorientation trajectory using the stated traditional control methods of reorientation.

Additionally, spin phase error ambiguity can negatively affect performance of a minimum-angle reorientation. An angular position error signal can be regarded as the composition of spin axis attitude error and spin phase error. The spin phase error refers to the angular error about the satellite spin axis. When the commanded and estimated attitudes are not synchronized in the spin phase, the direction of the position error vector is dependent on the magnitude of spin phase error. This is referred to as spin phase error ambiguity. The spin phase error ambiguity increases the difficulty in predicting the spin axis trajectory and maneuver time.

Thus, there exists a need for an improved satellite reorientation system that allows for the accurate control of the spin axis trajectory and that allows for minimum-angle slew to be performed along a path of minimum distance end-to-end.

SUMMARY OF THE INVENTION

The present invention provides spin axis reorientation systems and methods for a satellite. In multiple embodiments of the present invention, a reorientation controller for a satellite is provided that includes a slew rate command generator that generates a slew rate command signal ($\vec{\omega}_{r\_cmd}$) in response to an attitude error signal. The attitude error signal corresponds to the difference between an initial attitude and a target attitude. The slew rate command generator may introduce a phase lead ($\theta_L$) into the slew rate command signal ($\vec{\omega}_{r\_cmd}$). The controller may perform a spin phase synchronization when the target attitude is unsynchronized in spin phase with the initial attitude. The satellite may perform a reorientation maneuver in response to the slew rate command signal ($\vec{\omega}_{r\_cmd}$).

The embodiments of the present invention provide several advantages. One such advantage that is provided by an embodiment of the present invention is the provision of introducing a phase lead into the generation of a slew rate command signal. The introduction of a phase lead can compensate for the slew rate response lag due to finite control bandwidth and control transport time delay.

Another advantage that is provided by an embodiment of the present invention is the provision of performing spin phase synchronization when the target attitude and the initial or estimated attitude are not synchronized in spin phase. In so doing, the stated embodiment avoids the uncertainty of spin axis trajectory caused by spin phase error ambiguity.

Furthermore, another embodiment of the present invention provides spin axis trajectory shaping capability, which improves satellite reorientation control. This capability provides the advantage of increased flexibility of attitude maneuver.

Moreover, the embodiments of the present invention in providing the above stated advantages minimize travel distance of a satellite during a minimum-angle slew of a spin axis reorientation maneuver. As such and in general, the stated advantages are more fuel efficient than techniques that involve moving the spin axis along an arbitrary path.

The present invention itself, together with further objects and attendant advantages, will be best understood by reference to the following detailed description, taken in conjunction with the accompanying drawing.

BRIEF DESCRIPTION OF THE DRAWINGS

FIG. 3 is a signal flow and block diagrammatic representation of the reorientation system in accordance with an embodiment of the present invention;

FIG. 4 is a coordinate system illustrating the relationship between an instantaneous slew rate command signal and an estimated angular rate;

FIG. 5 is a two dimensional diagram representing the projection of a spin axis trajectory on to a plane normal to the satellite spin axis;

FIG. 6 is a coordinate system illustrating the introduction of phase lead in the generation of a slew rate command in accordance with an embodiment of the present invention;

LIST OF SYMBOLS $\Delta q$ Attitude error quaternion.
$\vec{\Delta \Theta}$ Rotated position error vector.
$\Delta \Theta_{lim}$ Position error limit.
$\omega_{lim}$ Magnitude of the slew rate command.
$\vec{\omega}_{r\_cmd}$ Slew rate command signal.
$\vec{\omega}_{s\_cmd}$ Spin rate command signal.
$K_8$ Position feedback control gain.
$K_\omega$ Proportional rate feedback control gain matrix.
$k_\omega$ Proportional rate feedback control gain.
$\vec{\alpha}_c$ Acceleration command signal.
$\vec{\omega}_b$ Measured or estimated angular rate.
$\vec{\omega}_r$ Slew rate response.
$\theta_d$ Phase lag of the slew rate response $\vec{\omega}_r$.
$\theta_l$ Phase lead of a slew rate command signal.
$\vec{\omega}_s$ Magnitude of the spin rate offset command signal or spin speed of satellite.

$\vec{u}_{spin}$ Unit vector along the spin axis.
$T_{delay}$ Transport time delay of a satellite reorientation system.
$\theta_{reor}$ Reorientation maneuver angle.
$\epsilon_\Theta$ Control position error signal.
$\epsilon_\omega$ Control rate error signal.

DETAILED DESCRIPTION

Spin axis excursion, which is defined as the deviation of the spin axis trajectory of a satellite from a non-curved path, has been determined to be due to finite control bandwidth, control transport time delay, and may also be due to spin phase error ambiguity. Finite control bandwidth and transport time delay cause the actual slew rate of the spin axis to lag in phase with respect to a slew rate command signal. This lag prevents the spin axis trajectory of a satellite to follow a minimum-angle slew for a spinning satellite during a reorientation maneuver. The embodiments of the present invention account for this lag to provide an improved system and method of reorienting the spin axis of a satellite.

While the present invention is described with respect to a system and method of reorienting the spin axis of a satellite, the present invention may be adapted to be used in various applications known in the art. The present invention may be applied in military and civilian applications. The present invention may be applied to aerospace systems, telecommunication systems, intelligent transportation systems, global positioning systems, and other systems known in the art.

In the following description, various operating parameters and components are described for one constructed embodiment. These specific parameters and components are included as examples and are not meant to be limiting.

Figure 1:
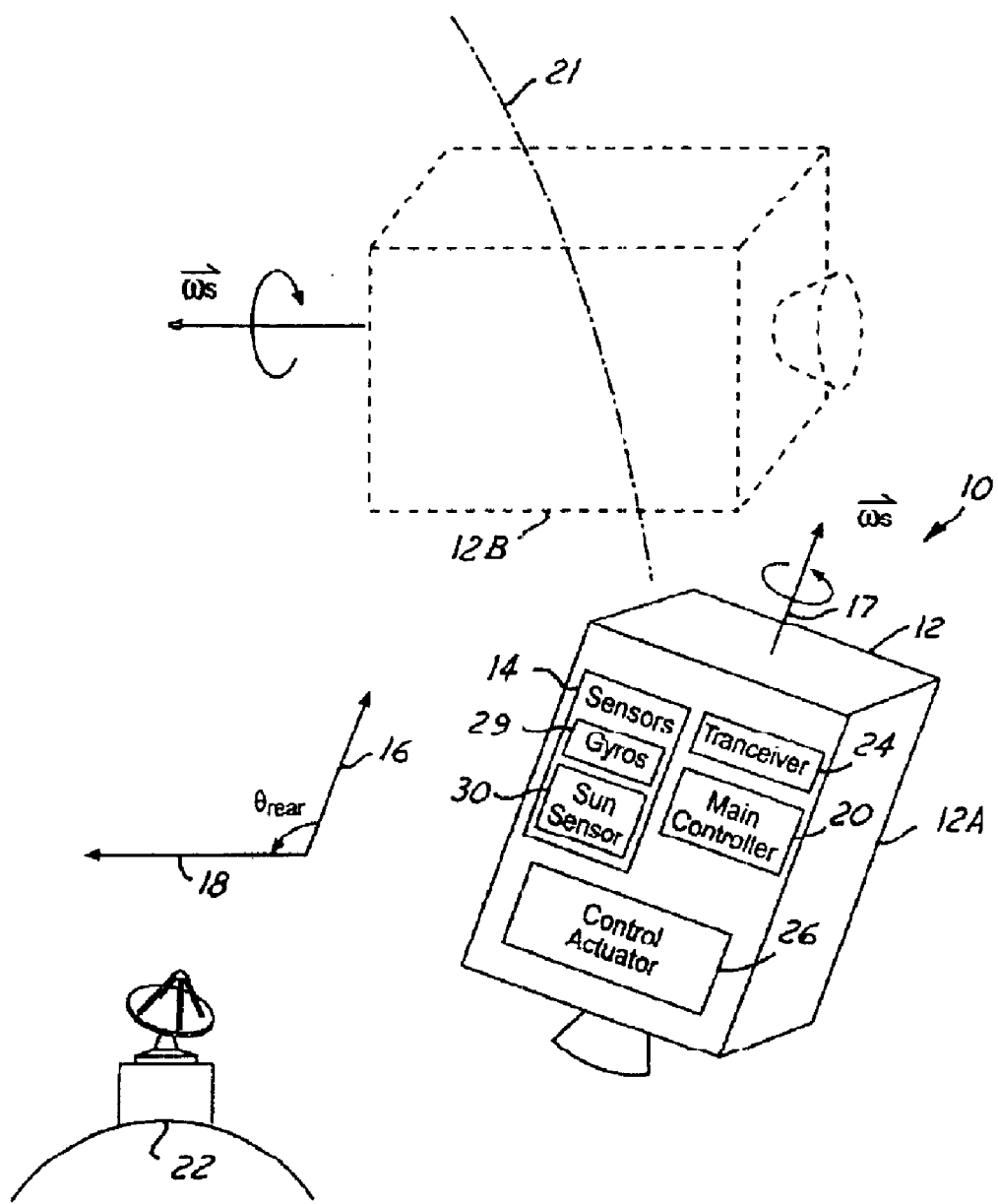
FIG. 1 is a vector and block diagrammatic view of a satellite reorientation system for a satellite in accordance with an embodiment of the present invention.

Referring now to FIG. 1, a vector and block diagrammatic view of a satellite reorientation system 10 for a spacecraft or satellite 12 in accordance with an embodiment of the present invention is shown. The satellite 12 is shown in an initial orientation 12A and a final orientation 12B of a reorientation maneuver. A first vector 16 represents an initial orientation of the satellite spin axis 17 in inertial space. A second vector 18 represents the target orientation of the spin axis 17 in inertial space. Angle between the two vectors 16 and 1B is referred to as the total reorientation maneuver angle $\omega_{reor}$.

The reorientation system 10 maintains the spin rate $\vec{\omega}_s$ of the satellite 12 before, during, and after the reorientation maneuver. In one embodiment of the present invention, the center of mass movement of the satellite 12 along the orbit 21 is ignored, during the reorientation maneuver.

The reorientation system 10 may include multiple sensors 14 for the estimation and determination of the attitude of the satellite 12. The commanded or target attitude may be determined and generated by a main controller 20, or received from another spacecraft (not shown) or ground stations 22 (only one is shown) via a transceiver 24. The system 10 includes the controller 20 that performs a reorientation maneuver in response to the signals received from the sensors 14 and the signals regarding a desired attitude. The controller 20 in performing the reorientation maneuver generates a slew rate command signal $\vec{\omega}_{r\_cmd}$. In response to the slew rate command signal $\vec{\omega}_{r\_cmd}$, the reorientation system 10 generates a torque signal, which is received by a control actuator 26 and used in repositioning the orientation of the satellite 12.

The sensors 14 may include gyros 29, sun sensors 30, or other sensors known in the art for the estimation and determination of the attitude of the satellite 12. Any number of each of the sensors 14 may be utilized.

The controller 20 may be microprocessor based such as a computer having a central processing unit, memory (RAM and/or ROM), and associated input and output buses. The controller 20 may be an application-specific integrated circuit or may be formed of other logic devices known in the art. The controller 20 may be a portion of a central control unit or may be a stand-alone controller, as shown.

The control actuator 26 is generally a torque-generating device and may be in various forms. The control actuator 26 may include multiple thrusters, actuators, motors, a combination of thrusters and reaction wheels, or may be in some other form known in the art.

Figure 2:
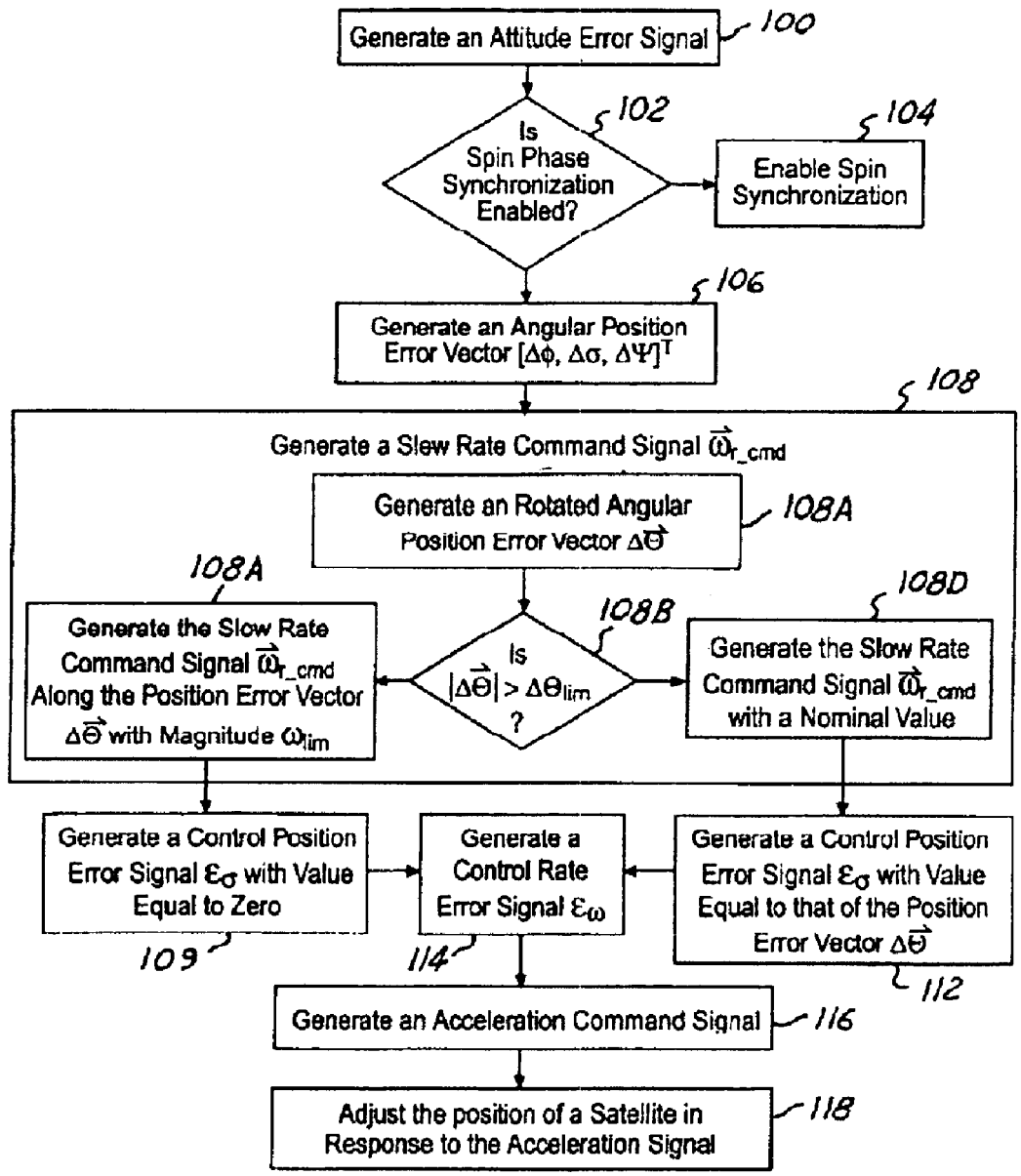
FIG. 2 is a logic flow diagram illustrating a method of reorienting a satellite in accordance with multiple embodiments of the present invention.

Referring now to FIG. 2, a logic flow diagram illustrating a method of reorienting a spinning satellite in accordance with multiple embodiments of the present invention is shown.

In step 100, the controller 20 compares an initial or estimated attitude of the satellite 12 and a desired or target attitude and generates an attitude error signal. The error signal may be represented by an error quaternion $\Delta q$.

In step 102, the controller 20 determined whether spin phase synchronization is enabled. When the spin phase synchronization is enabled, step 104 is performed, otherwise step 106 is performed. When the target attitude is synchronized in spin phase with the estimated attitude, the spin phase synchronization can be skipped or, in other words, step 102 may not be performed.

In step 104, the spin phase synchronization is performed to remove the spin phase error from the error quaternion $\Delta q$, generated in step 100. Assume $\vec{u}_{spin}$ is a unit vector along the spin axis, the spin phase synchronization may be performed by the quaternion multiplication $\Delta q \leftarrow \Delta q \delta q_{spin}$, where $\delta q_{spin}$ is defined in Equations 1 and 2.

$$\delta q_{spin} = \frac{[-(\bar{u}_{spin})^T \varepsilon \Delta q_{(4)}]}{\sqrt{\varepsilon^2 + (\Delta q_{(4)})^2}} \quad (1)$$

$$\varepsilon = \Delta q(1) \vec{u}_{spin+sc\ (1)} + \Delta q(2) \vec{u}_{spin+sc\ (2)} + \Delta q(3) \vec{u}_{spin+sc\ (3)} \quad (2)$$

The subscripts 1, 2, 3, denote the body-fixed control axes. The vector part of the quaternion $\Delta q$ indicates the direction of the Euler axis. The scalar part of the quaternion $\Delta q$, or fourth component, is related to the rotation angle about the Euler axis.

In step 106, an angular position error vector, represented by $[\Delta\phi, \Delta\theta, \Delta\psi]^T$, is generated based on the error quaternion. Where $\Delta\phi$, $\Delta\theta$, and $\Delta\psi$ represent the error components about the three coordinate axes of the satellite body coordinate system. When the spin phase synchronization is enabled, the spin phase error is removed from the angular error signal in forming the position error vector $[\Delta\phi, \Delta\theta, \Delta\psi]^T$.

Referring now also to FIG. 3, a flow diagrammatic representation of the reorientation system 10 in accordance with an embodiment of the present invention is shown.

In step 108, the controller 20 generates a slew rate command signal $\vec{\omega}_{r\_cmd}$ based on the position error vector $[\Delta\phi, \Delta\theta, \Delta\psi]^T$.

In step 108A, a trajectory shaping logic 50 of a slew rate command generator 52 rotates the position error vector $[\Delta\phi, \Delta\theta, \Delta\psi]^T$ about the unit vector $\vec{u}_{spin}$ by a constant angle to generate a rotated angular position error vector $\vec{\Delta\Theta}$. In one embodiment of the present invention, the trajectory shaping logic is a 3×3 rotating transformation or shaping matrix $C_{shaping}$, which is described in further detail below. The slew rate generator 52, by multiplying the position error vector $[\Delta\phi, \Delta\theta, \Delta\psi]^T$ by the shaping matrix $C_{shaping}$, introduces a phase lead, ahead of the position error vector, into the slew rate command signal $\vec{\omega}_{r\_cmd}$.

Referring now to FIG. 4, a coordinate system illustrating the relationship between the instantaneous slew rate command signal $\vec{\omega}_{r\_cmd}$ and a measured or estimated angular response $\vec{\omega}_b$ is shown. An arbitrary inertial coordinate system o-xyz is shown, whereby the spin axis of the satellite 12 is assumed to be initially along the vector $\vec{oz}_0$, and the target vector $\vec{oz}_1$, represents the target orientation of the spin axis in inertial space. A first unit vector $\hat{n}_{P1}$ is normal to a plane P1, which is spanned by the initial attitude $z_0$, and the target attitude $z_1$.

A minimum-angle reorientation maintains movement of the spin axis in the plane Pi during the maneuver. However, when a slew rate command signal $\vec{\omega}_{r\_cmd}$ is generated along a first unit vector $\hat{n}_{P1}$, the slew rate response is actually along a second unit vector $\hat{n}_{P1}$. The actual spin axis trajectory 60, as best seen in FIG. 5, of the satellite 12 is tangent to a plane P2. The fixed angle $\theta_d$, between the planes P1 and P2, is referred to as the phase lag of the slew rate response $\vec{\omega}_{r\_cmd}$ relative to the slew rate command signal $\vec{\omega}_{r\_cmd}$. The phase lag occurs due to the finite control bandwidth and the transport time delay of the satellite 12 and can be determined using equation 3, where $\omega_s$ is the magnitude of the spin rate command or the spin speed of the satellite 12, and $k_\omega$ is the proportional rate control gain.

$$\theta_d = \arctan\left(\frac{\omega_s}{k_\omega}\right) + T_{delay}\omega_s \quad (3)$$

The first term arctan $$\left(\frac{\omega_s}{k_\omega}\right)$$

is related to the control gain. $T_{delay}$ is the transport time delay, which is dependent on control system hardware and software implementations performed. The contribution of transport time delay to the phase lag $\theta_d$ is smaller than the first term arctan $$\left(\frac{\omega_s}{k_\omega}\right).$$

Without applying the trajectory shaping logic 50, which is described in further detail below, the spin axis trajectory undesirably follows a curved path, such as the trajectory 60. That is for any point $z_1$ on the trajectory 60, the angle between plane P2 and line $\vec{oz}_1$, is constant and is equal to the phase lag $\theta_d$.

Referring now to FIG. 5, the coordinate axis $x_1$, represents the remaining reorientation maneuver angle. At the initial attitude $z_0$, $x_1$ is equal to the total maneuver angle $\theta_{reor}$. At the target attitude $z_1$, $x_1$ is equal to zero. $x_2$ represents the spin axis excursion. The desired path, through a minimum-angle reorientation, is the straight line $\overline{z_0 z_1}$, from the initial attitude $z_0$ to the target attitude $z_1$.

The parametric curve equations of spin axis trajectory in $(x_1, x_2)$ coordinates can be represented by equations 4 and 5 for attitude $\phi$ varying from 0° to 90°.

$$x_1 = \theta_{reor} e^{\frac{-\phi}{\tan\theta_d}} \cos\phi \qquad (4)$$

$$x_2 = -\theta_{reor} e^{\frac{-\phi}{\tan\theta_d}} \sin\phi \qquad (5)$$

The maximum spin axis excursion is equal to $$\theta_{reor} e^{\frac{-\phi}{\tan\theta_d}} \sin\theta_d,$$

which is proportional to the phase lag $\theta_d$.

The spin axis trajectory 60 can be changed by using a constant shaping matrix represented by equation 6.

$$C_{shaping} = \vec{u}_{spin}(\vec{u}_{spin})^T + [I_{3\times3} - \vec{u}_{spin}(\vec{u}_{spin})^T] \cos\theta_L - [\vec{u}_{spin}^{\,3}] \sin\theta_L \qquad (6)$$

$I_{3\times3}$ is a 3-by-3 identity matrix, and $\vec{u}_{spin}^{\,3}$ is the skew-symmetric matrix, which is represented and defined by equation 7. $\vec{u}_{spin}$ is a unit vector along the spin axis and represented in the spacecraft body frame. The spin axis may be any fixed axis in spacecraft body frame.

$$\bar{u}_{spin}^{\,x} = \begin{bmatrix} 0 & \bar{u}_{spin}(3) & \bar{u}_{spin}(2) \\ \bar{u}_{spin}(3) & 0 & \bar{u}_{spin}(1) \\ \bar{u}_{spin}(2) & \bar{u}_{spin}(1) & 0 \end{bmatrix} \qquad (7)$$

The shaping matrix $C_{shaping}$ can be used to provide a phase lead $\theta_L$ on the slew rate command signal $\vec{\omega}_{r\_cmd}$ relative to position error vector $[\Delta\phi, \Delta\theta, \Delta\psi]^T$. By setting the phase lead $\theta_L$ equal to the phase lag $\theta_d$, the controller 20 compensates for the phase lag in the slew rate response $\vec{\omega}_r$ and a minimum-angle slew can be achieved.

Referring now to FIG. 6, a coordinate system illustrating the introduction of the phase lead $\theta_L$ in the generation of the slew rate command signal $\vec{\omega}_{r\_cmd}$ in accordance with an embodiment of the present invention is shown. The lead angle $\theta_L$ is set equal to the phase lag $\theta_d$. The planes P1 and P2 are overlapping. Therefore, the resulting slew rate response $\vec{\omega}_r$ is along the direction of the position error vector $[\Delta\phi, \Delta\theta, \Delta\psi]^T$.

Although in the above-described method the phase lead $\theta_L$ is set equal to the phase lag $\theta_d$, the spin axis trajectory 60 may also be shaped to a curved path on either side of the straight-line path by setting the phase lead $\theta_L$, to be less than or greater than the phase lag $\theta_d$.

Continuing on with the method steps of the embodiment of FIG. 2, in step 108B, the slew rate command generator 52 compares the magnitude of the rotated angular position error vector $\overrightarrow{\Delta\Theta}$ to a position error limit $\Delta\Theta_{lim}$, which is represented by switch 62.

In step 108C, when the magnitude of the position error vector $\overrightarrow{\Delta\Theta}$ is greater than the position error limit $\Delta\Theta_{lim}$ a slew rate command signal $\vec{\omega}_{r\_cmd}$ cad is generated along the direction of the position error vector $\overrightarrow{\Delta\Theta}$ with magnitude $\omega_{lim}$. In step 108D, when the magnitude of the position error vector $\overrightarrow{\Delta\Theta}$ is less than the position error lim it $\Delta\Theta_{lim}$ a slew rate command signal $\vec{\omega}_{r\_cmd}$ is generated with a value of approximately zero.

In step 109, when the magnitude of the position error vector $\overrightarrow{\Delta\Theta}$ is greater than the position error limit $\Delta\Theta_{lim}$, the control position error signal $\epsilon_\theta$ is set approximately equal to zero. It is assumed that the position error limit $\Delta\Theta_{lim}$ is small compared to the total maneuver angle $\theta_{reor}$ such that the control position error signal $\epsilon_\theta$ can be ignored during a large angle maneuver.

In step 112, when the magnitude of the position error vector $\overrightarrow{\Delta\Theta}$ is less than the value of the position error limit $\Delta\Theta_{lim}$ the control position error signal $\epsilon_\theta$ is set approximately equal to the position error vector $\overrightarrow{\Delta\Theta}$.

In step 114, the control rate error signal $\epsilon_\omega$ is generated. The rate error signal $\epsilon_\omega$ is defined as the difference between a desired angular rate and an estimated angular rate $\omega_b$ of the satellite 12. The slew rate command $\vec{\omega}_{r\_cmd}$ and the spin rate command signal $\vec{\omega}_{r\_cmd}$ are summed followed by the generation of the rate error signal $\epsilon_\omega$. The spin rate command signal $\vec{\omega}_{r\_cmd}$ may be received from the ground stations 22.

In step 116, the controller 20 generates an acceleration command signal $\vec{\alpha}_c$ through use of the position control logic and rate control logic. In an embodiment of the present invention, the position control logic is in the form of a position feedback control gain matrix $K_\theta$ and the rate control logic is in the form of a proportional rate gain matrix $K_\omega$. The position error signal se is multiplied by the feedback control gain matrix $K_\theta$. The rate error signal $\epsilon_\omega$ is multiplied by the rate gain matrix $K_\omega$. The proportional rate gain matrix $K_\omega$ is assumed to be a constant diagonal matrix with control gain $K_\omega$ in the diagonal entries. The resulting products are summed to generate the acceleration command signal $\vec{\alpha}_c$.

In step 118, the controller 20 converts the acceleration command signal $\vec{\alpha}_c$ to a torque command signal. The control actuator receives and in response to the torque command signal adjusts the orientation of the satellite 12.

The above-described steps are meant to be an illustrative example; the steps may be performed sequentially, simultaneously, synchronously or in a different order depending upon the application.

Results of a first simulated satellite spin axis reorientation maneuver are illustrated in FIGS. 7A–D in accordance with an embodiment of the present invention. For the stated embodiment, satellite spin rate was set at 4.5 degrees per second along the z-axis of the body coordinate system and the unit vector $\vec{u}_{spin}$ was set equal to $[0\ 0\ 1]^T$. The shaping matrix $C_{shaping}$, used for the stated simulation and the following simulation, is represented by Equation 8.

$$C_{shaping} = \begin{bmatrix} \cos\theta_L & \sin\theta_L & 0 \\ -\sin\theta_L & \cos\theta_L & 0 \\ 0 & 0 & 1 \end{bmatrix} \qquad (8)$$

Figure 7A:
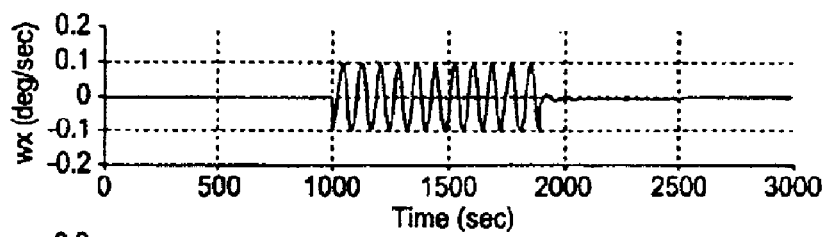
FIG. 7A is a graph illustrating a simulated angular rate along an x-axis of a satellite, spinning at a first spin rate, for a spin axis reorientation maneuver in accordance with an embodiment of the present invention.
Figure 7B:
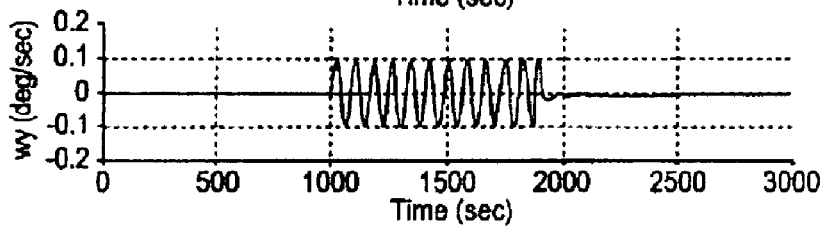
FIG. 7B is a graph illustrating a simulated angular rate along a y-axis of the satellite, simulated in FIG. 7A, in accordance with an embodiment of the present invention.
Figure 7C:
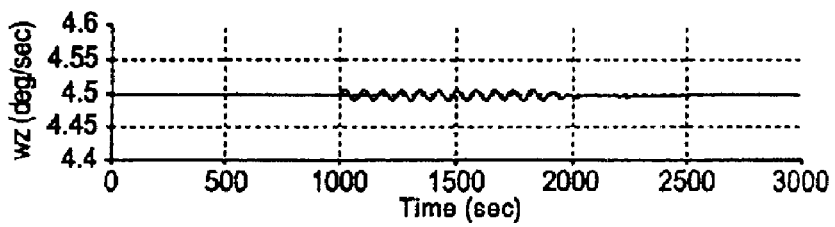
FIG. 7C is a graph illustrating a simulated angular rate along a z-axis of the satellite, simulated in FIG. 7A and 7B, in accordance with an embodiment of the present invention.
Figure 7D:
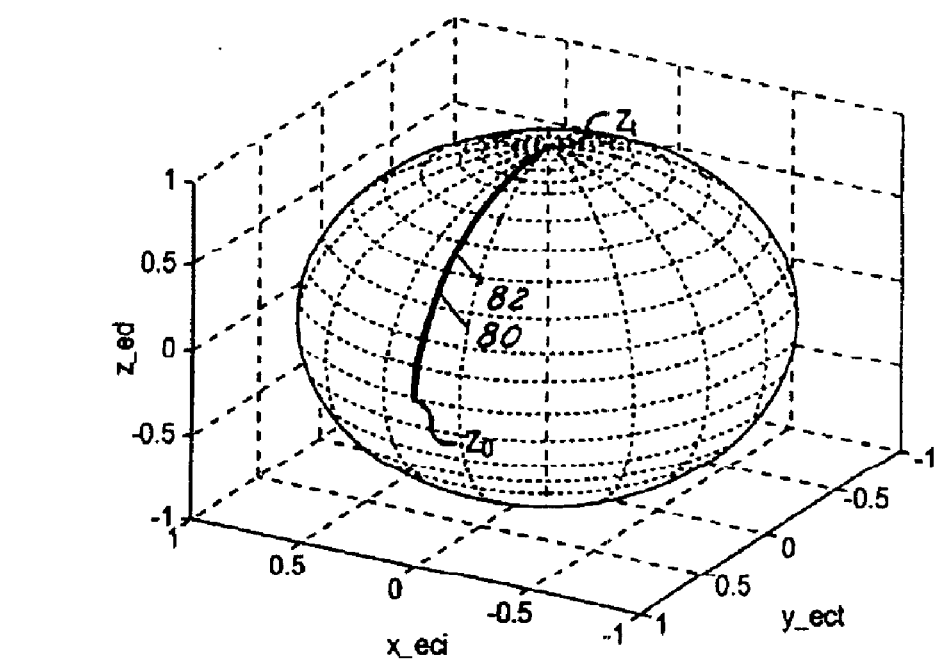
FIG. 7D is a spin axis trajectory plot of the satellite, simulated in FIGS. 7A–7C, in an earth centered inertial coordinate frame in accordance with an embodiment of the present invention.
Figure 8A:
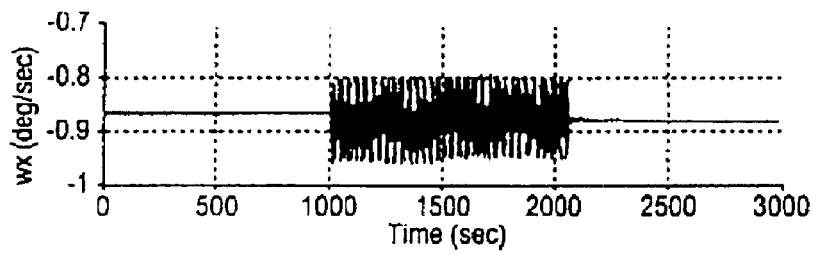
FIG. 8A is a graph illustrating a simulated angular rate along an x-axis of a satellite, spinning at a second spin rate, for another spin axis reorientation maneuver in accordance with another embodiment of the present invention.
Figure 8B:
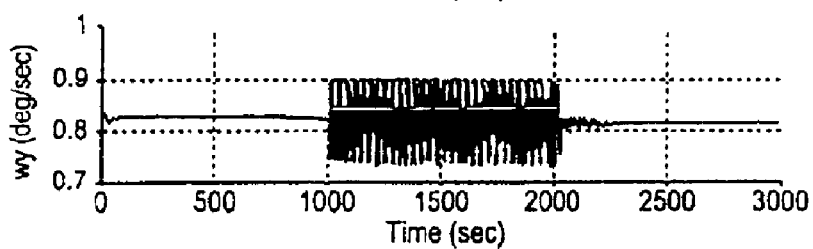
FIG. 8B is a graph illustrating a simulated angular rate along a y-axis of the satellite, simulated in FIG. 8A, in accordance with an embodiment of the present invention.
Figure 8C:
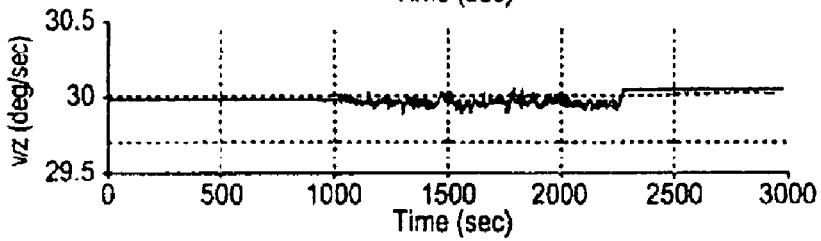
FIG. 8C is a graph illustrating a simulated angular rate along a z-axis of the satellite, simulated in FIGS. 8A and 8B, in accordance with another embodiment of the present invention.
Figure 8D:
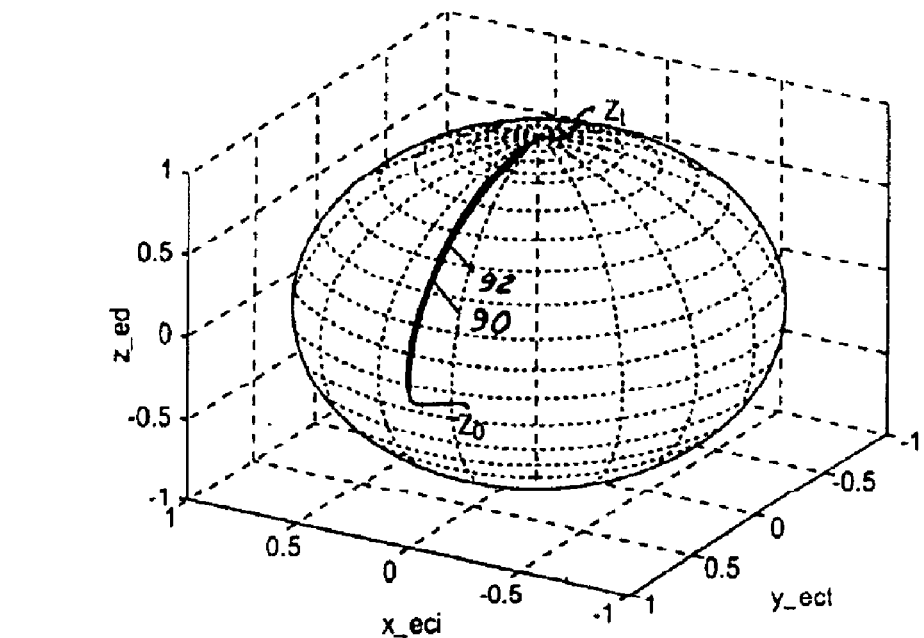
FIG. 8D is a spin axis trajectory plot of the satellite, simulated in FIGS. 8A-8C, in an earth centered inertial coordinate frame in accordance with another embodiment of the present invention.

Satellite reorientation was initially controlled and balanced by reaction wheels. The reorientation maneuver arbitrarily started at 1000 seconds. The satellite angular rates $\omega x$, $\omega y$, and $\omega z$ along x, y, and z axes are shown in FIGS. 7A–C. FIG. 7D shows the trajectory 80 of the spin axis 17, or the trace of the unit vector $\vec{u}_{spin}$, on a unit sphere in an earth centered inertial coordinate frame. The spin axis trajectory 80 closely follows a desired minimum-angle path 82.

Results of another simulated reorientation maneuver is illustrated in FIGS. 8A–D. The satellite spins at 30 degrees per second about a principal axis. The reorientation maneuver arbitrarily starts at 1000 seconds. The satellite angular rates $\omega x$, $\omega y$, and $\omega z$ and the spin axis trajectory 90 are shown is FIG. 8. Again the spin axis trajectory 90 closely follows a desired minimum-angle path 92.

The present invention provides a satellite reorientation system that incorporates the use of a re-programmable shaping matrix to introduce phase lead into the reorientation of the spin axis of a satellite. The present invention also provides spin phase synchronization capability. As such, the present invention compensates for phase lag and removes spin phase error ambiguity, which in turn allows for accurate spin axis trajectory control of the satellite during a reorientation mission.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A reorientation controller for a satellite comprising a slew rate command generator generating a slew rate command signal in response to an attitude error signal, corresponding to the difference between an initial attitude and a target attitude, said slew rate command generator introducing a phase lead into said slew rate command signal.

2. A controller as in claim 1 wherein said slew rate command generator performs a spin phase synchronization when said target attitude is unsynchronized in spin phase with said initial satellite attitude.

3. A controller as in claim 1 wherein said initial attitude is an estimated attitude.

4. A reorientation controller for a satellite comprising a slew rate command generator generating a slew rate command signal in response to an attitude error signal, corresponding to the difference between an initial attitude and a target attitude, said slew rate command generator performing a spin phase synchronization when said target attitude is unsynchronized in spin phase with said initial attitude.

5. A controller as in claim 4 wherein said slew rate command generator introduces a phase lead into said slew rate command signal.

6. A satellite reorientation system for a satellite comprising:
   a controller generating an attitude error signal in response to an initial attitude and a target attitude and generating a slew rate command signal in response to said attitude error signal, said controller introducing a phase lead into said slew rate command signal; and
   at least one control actuator coupled to said controller and adjusting attitude of a spin axis of the satellite in response to said slew rate command signal.

7. A system as in claim 6 wherein said controller introduces said phase lead using trajectory-shaping logic.

8. A system as in claim 6 wherein said controller introduces said phase lead using trajectory-shaping logic in the form of a matrix.

9. A system as in claim 6 wherein said controller introduces said phase lead using a shaping matrix that has a default approximately equal to an identity matrix.

10. A system as in claim 6 wherein said controller introduces said phase lead using a matrix that is re-programmable.

11. A system as in claim 6 wherein said controller performs spin phase synchronization when said target attitude is unsynchronized in spin phase with said initial attitude.

12. A system as in claim 6 wherein said controller in introducing said phase lead introduces said phase lead into generation of said slew rate command signal.

13. A system as in claim 6 wherein said controller introduces said phase lead to compensate for a phase lag caused by finite control bandwidth of the satellite.

14. A system as in claim 6 wherein said controller introduces said phase lead to compensate for a phase lag caused by transport signal time delay.

15. A system as in claim 6 wherein said controller introduces said phase lead to correspond with a phase lag of an actual slew rate of the satellite.

16. A system as in claim 6 wherein said controller introduces said phase lead to correspond with a phase lag of an actual slew rate of the satellite that is associated with a spin axis of the satellite.

17. A system as in claim 6 wherein said controller in generating said slew rate command signal generates an angular position error vector.

18. A system as in claim 17 wherein said controller generates said slew rate command signal along said angular position error vector.

19. A system as in claim 17 wherein said controller generates a control position error signal in response to said angular position error vector.

20. A system as in claim 6 wherein said controller generates a rate error signal through summation of said slew rate command signal and a spin rate command signal and subtraction of a satellite angular rate signal.

21. A system as in claim 6 wherein said controller generates an acceleration command signal in response to a position error signal and a rate error signal, said at least one control actuator adjusting spin axis orientation of the satellite in response to said acceleration command signal.

22. A system as in claim 6 wherein said controller generates an acceleration command signal in response to a position error signal multiplied by a position feedback control gain matrix.

23. A system as in claim 6 wherein said controller generates an acceleration command signal in response to a rate error signal multiplied by a proportional rate gain matrix.

24. A satellite reorientation system for a satellite comprising:
   a controller generating a slew rate command signal in response to an initial attitude and a target attitude, said controller performing spin phase synchronization; and
   at least one control actuator coupled to said controller and adjusting position of the satellite in response to said slew rate command signal.

25. A system as in claim 24 wherein said at least one control actuator is selected from at least one of an actuator, a motor, a thruster, and a reaction wheel.

26. A method of reorienting the spin axis of a satellite comprising:
   generating a slew rate command signal in response to an initial attitude and a target attitude;
   introducing a phase lead into said slew rate command signal; and
   adjusting attitude of the satellite in response to said slew rate command signal.

27. A method as in claim 26 further comprising:
   determining an angular position error vector in response to said initial attitude and said target attitude; and
   generating said slew rate command signal in response to said angular position error vector.

28. A method as in claim 27 further comprising:

applying position and rate controls in response to said angular position error vector; and adjusting attitude of a spin axis of the satellite in response to said slew rate command signal.

29. A method as in claim 26 further controlling a spin axis trajectory of the satellite during a reorientation maneuver.

30. A method as in claim 29 wherein introducing said phase lead comprises using a trajectory shaping logic that is in the form of a shaping matrix.

31. A method as in claim 26 further comprising performing a minimum-angle spin axis reorientation of a satellite.

32. A method as in claim 31 wherein performing a minimum-angle spin axis reorientation comprises introducing said phase lead with a value approximately equal to a phase lag.

33. A method as in claim 26 wherein introducing said phase lead comprises compensating for a phase lag caused by finite control bandwidth of the satellite.

34. A method as in claim 26 wherein introducing said phase lead comprises compensating for a phase lag caused by transport time delay of the satellite.

35. A method as in claim 26 wherein introducing said phase lead comprises using a trajectory shaping logic that is in the form of a shaping matrix computed based on a satellite spin axis unit vector, spin speed, and transport time delay.

36. A method as in claim 26 further comprising performing a spin phase synchronization when a spin axis of the satellite is approximately equal to a non-geometric body axis.

37. A method of reorienting the spin axis of a satellite comprising:

generating a slew rate command signal in response to an initial attitude and a target attitude;

performing a spin phase synchronization; and adjusting attitude of the satellite in response to said slew rate command signal.

38. A method as in claim 37 further comprising introducing a phase lead into said slew rate command signal.

39. A method as in claim 37 further comprising performing a minimum-angle spin axis reorientation of a satellite.

40. A method as in claim 37 further comprising compensating for a phase lag caused by finite control bandwidth and transport time delay of the satellite.

* * * * *